(12) United States Patent
Leung

(10) Patent No.: US 11,356,130 B2
(45) Date of Patent: *Jun. 7, 2022

(54) DEVICES AND METHODS FOR RADIO FREQUENCY FRONT END SYSTEMS

(71) Applicant: SKYWORKS SOLUTIONS, INC., Irvine, CA (US)

(72) Inventor: John Chi-Shuen Leung, Foothill Ranch, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,661

(22) Filed: Mar. 29, 2021

(65) Prior Publication Data

US 2021/0351798 A1    Nov. 11, 2021

Related U.S. Application Data

(63) Continuation of application No. 16/833,643, filed on Mar. 29, 2020, now Pat. No. 10,965,329, which is a continuation of application No. 15/936,430, filed on Mar. 26, 2018, now Pat. No. 10,608,679.

(60) Provisional application No. 62/533,827, filed on Jul. 18, 2017, provisional application No. 62/476,102, filed on Mar. 24, 2017.

(51) Int. Cl.
*H04B 7/02* (2018.01)
*H04B 1/00* (2006.01)
*H04B 7/0404* (2017.01)
*H04B 7/08* (2006.01)

(52) U.S. Cl.
CPC ......... *H04B 1/0064* (2013.01); *H04B 1/0053* (2013.01); *H04B 7/0404* (2013.01); *H04B 7/0825* (2013.01)

(58) Field of Classification Search
CPC .. H04B 1/0064; H04B 1/0053; H04B 7/0404; H04B 7/0825
USPC ....... 375/267, 260, 259, 347, 346, 316, 377, 375/343, 350, 349, 229, 230, 232
See application file for complete search history.

(56) References Cited

U.S. PATENT DOCUMENTS

| | | | |
|---|---|---|---|
| 2005/0277387 A1* | 12/2005 | Kojima | H04B 7/04 455/78 |
| 2006/0135210 A1 | 6/2006 | Frank | |
| 2006/0197538 A1 | 9/2006 | Leinonen et al. | |

(Continued)

*Primary Examiner* — Zewdu A Kassa
(74) *Attorney, Agent, or Firm* — Chang & Hale LLP

(57) ABSTRACT

A wireless device comprising a first antenna and second antenna, a transceiver and a radio frequency front end system electrically coupled between the transceiver and the antennas. The RF front end system includes a first module operable to provide a high band transmit signal to the first antenna, receive a first high band receive signal and a first mid band receive signal from the first antenna. The first high band receive signal has a frequency range greater than that of the first mid band receive signal. The RF front end system further includes a second module operable to provide a mid band transmit signal to the second antenna, receive a second mid band receive signal and a second high band receive signal from the second antenna. The second high band receive signal has a frequency range greater than that of the second mid band receive signal.

20 Claims, 10 Drawing Sheets

(56) References Cited

U.S. PATENT DOCUMENTS

2007/0030116 A1* 2/2007 Feher .................... H04W 64/00
340/5.53

* cited by examiner

DEVICES AND METHODS FOR RADIO FREQUENCY FRONT END SYSTEMS

CROSS-REFERENCE TO RELATED APPLICATION(S)

This application is a continuation of U.S. patent application Ser. No. 16/833,643, filed Mar. 29, 2020, entitled "DEVICES AND METHODS FOR RADIO FREQUENCY FRONT END SYSTEMS," which is a continuation of U.S. patent application Ser. No. 15/936,430, filed Mar. 26, 2018, entitled "APPARATUS AND METHODS FOR RADIO FREQUENCY FRONT END SYSTEMS," now U.S. Pat. No. 10,608,679, issued Mar. 31, 2020, which claims priority to U.S. Provisional Patent Application No. 62/476,102, filed Mar. 24, 2017, entitled "APPARATUS AND METHODS FOR RADIO FREQUENCY FRONT END SYSTEMS," and U.S. Provisional Patent Application No. 62/533,827, filed Jul. 18, 2017, entitled "APPARATUS AND METHODS FOR RADIO FREQUENCY FRONT END SYSTEMS." The contents of each of the above-referenced applications are expressly incorporated by reference herein in their entireties for all purposes.

BACKGROUND

Field

Embodiments of the invention relate to electronic systems, and in particular, to radio frequency (RF) electronics.

Description of Related Art

A radio frequency (RF) device can include multiple antennas for supporting communications. Additionally, the RF device can include a radio frequency front end (RFFE) system for processing signals received from and transmitted to the antennas. The RFFE system can provide a number of functions, including, but not limited to, signal filtering, controlling component connectivity to the antennas, and/or signal amplification.

SUMMARY

In some implementations, the present disclosure relates to a wireless device comprising a plurality of primary antennas including a first antenna and second antenna, a transceiver and a radio frequency front end system electrically coupled between the transceiver and the plurality of primary antennas. The radio frequency front end system includes a first transmit and receive module operable to provide a high band transmit signal to the first antenna and to receive a first high band receive signal and a first mid band receive signal from the first antenna. The first high band receive signal may have a frequency content that is greater than a frequency content of the first mid band receive signal. The radio frequency front end system may further include a second transmit and receive module operable to provide a mid band transmit signal to the second antenna and to receive a second mid band receive signal and a second high band receive signal from the second antenna. The second high band receive signal may have a frequency content that is greater than a frequency content of the second mid band receive signal.

In some implementations, the present disclosure relates to a wireless device comprising a plurality of primary antennas including a first antenna and second antenna, a transceiver and a radio frequency front end system electrically coupled between the transceiver and the plurality of primary antennas. The radio frequency front end system includes a first transmit and receive module operable to provide a high band transmit signal to the first antenna and to receive a first high band receive signal and a first mid band receive signal from the first antenna. The first high band receive signal may have a frequency range that is greater than a frequency range of the first mid band receive signal. The radio frequency front end system may further include a second transmit and receive module operable to provide a mid band transmit signal to the second antenna and to receive a second mid band receive signal and a second high band receive signal from the second antenna. The second high band receive signal may have a frequency range that is greater than a frequency range of the second mid band receive signal.

In some embodiments, the first high band receive signal and the second high band receive signal of the wireless device are operable to support downlink multi-input and multi-output communications. In some embodiments, the first mid band receive signal and the second mid band receive signal of the wireless device are operable to support downlink multi-input and multi-output communications.

In some embodiments, the first high band receive signal and the first mid band receive signal of the wireless device are operable to support carrier aggregation. In some embodiments, the second mid band receive signal and the second high band receive signal of the wireless device are operable to support carrier aggregation.

In some embodiments, the first transmit and receive module of the wireless device includes a first plurality of high band signal paths and a first plurality of mid band signal paths that are switch coupled to the first antenna. In some embodiments, the second transmit and receive module of the wireless device includes a second plurality of high band signal paths and a second plurality of mid band signal paths that are switch coupled to the second antenna.

In some embodiments, the first transmit and receive module of the wireless device is electrically coupled to the first antenna without an intervening frequency multiplexer. In some embodiments, the first transmit and receive module of the wireless device is electrically coupled to the first antenna without an intervening multiband handling element.

In some embodiments, the radio frequency front end system of the wireless device further includes a diplexer electrically coupled between the second transmit and receive module and the second antenna.

In some embodiments, the radio frequency front end system of the wireless device further includes a third transmit and receive module electrically coupled to the second antenna via the diplexer, the third transmit and receive module configured to provide a low band transmit signal to the second antenna and to receive a low band receive signal from the second antenna.

In some embodiments, the plurality of primary antennas of the wireless device further includes a third antenna. The radio frequency front end system may further include a third transmit and receive module configured to provide a low band transmit signal to the third antenna and to receive a low band receive signal from the third antenna. In some embodiments, a plurality of diversity antennas of the wireless device includes a first diversity antenna and a second diversity antenna. The radio frequency front end system may be electrically coupled between the transceiver and the plurality of diversity antennas.

In some embodiments, the radio frequency front end system of the wireless device further includes a first diversity module configured to receive a first high band diversity receive signal and a first mid band diversity receive signal from the first diversity antenna. In some embodiments, a second diversity module of the wireless device is configured to receive a second mid band diversity receive signal and a second high band receive signal from the second diversity antenna.

In some embodiments, the first transmit and receive module of the wireless device includes a high band output switch configured to receive a plurality of high band diversity receive signals including the first high band diversity receive signal and the second high band diversity receive signal, the high band output switch further configured to provide the transceiver with a selected high band diversity receive signal. In some embodiments, the second transmit and receive module of the wireless device includes a mid band output switch configured to receive a plurality of mid band diversity receive signals including the first mid band diversity receive signal and the second mid band diversity receive signal, the mid band output switch further configured to provide the transceiver with a selected mid band diversity receive signal.

In some embodiments, the radio frequency front end system of the wireless device is operable to support four-by-four receive multi-input and multi-output communications.

In some embodiments, the frequency contents of the mid band transmit signal, the first mid band receive signal, and the second mid band receive signal are between 1 GHz and 2.3 GHz, and the frequency contents of the high band transmit signal, the first high band receive signal, and the second high band receive signal are greater than 2.3 GHz. In some embodiments, the mid band transmit signal, the first mid band receive signal, and the second mid band receive signal have frequencies between 1 GHz and 2.3 GHz, and the high band transmit signal, the first high band receive signal, and the second high band receive signal have frequencies greater than 2.3 GHz.

In some implementations, the present disclosure relates to a method of front end signal processing in a wireless device. The method may comprise providing a high band transmit signal to a first antenna using a first transmit and receive module, and receiving a first high band receive signal and a first mid band receive signal from the first antenna using the first transmit and receive module, the first high band receive signal having a frequency content that is greater than a frequency content of the first mid band receive signal. The method may further include providing a mid band transmit signal to a second antenna using a second transmit and receive module, and receiving a second mid band receive signal and a second high band receive signal from the second antenna using the second transmit and receive module, the second high band receive signal having a frequency content that is greater than a frequency content of the second mid band receive signal.

In some implementations, the present disclosure relates to a method of front end signal processing in a wireless device. The method may comprise providing a high band transmit signal to a first antenna using a first transmit and receive module, and receiving a first high band receive signal and a first mid band receive signal from the first antenna using the first transmit and receive module, the first high band receive signal having a frequency range that is greater than a frequency range of the first mid band receive signal. The method may further include providing a mid band transmit signal to a second antenna using a second transmit and receive module, and receiving a second mid band receive signal and a second high band receive signal from the second antenna using the second transmit and receive module, the second high band receive signal having a frequency range that is greater than a frequency range of the second mid band receive signal.

In some implementations, the method further comprises providing downlink multi-input and multi-output communications using the first high band receive signal and the second high band receive signal. In some implementations, the method further comprises providing downlink multi-input and multi-output communications using the first mid band receive signal and the second mid band receive signal.

In some implementations, the method further comprises providing carrier aggregation using the first high band receive signal and the first mid band receive signal. In some implementations, the method further comprises providing carrier aggregation using the second mid band receive signal and the second high band receive signal.

In some implementations, the method further comprises providing a low band transmit signal to the second antenna using a third transmit and receive module, and receiving a low band receive signal from the second antenna using the third transmit and receive module. In some implementations, the method further comprises providing a low band transmit signal to a third antenna using a third transmit and receive module, and receiving a low band receive signal from the third antenna using the third transmit and receive module.

In some implementations, the method further comprises receiving a first high band diversity receive signal and a first mid band diversity receive signal from a first diversity antenna using a first diversity module. In some implementations, the method further comprises receiving a second high band diversity receive signal and a second mid band diversity receive signal from a second diversity antenna using a second diversity module.

In some implementations, the method further comprises providing the first high band diversity receive signal from the first transmit and receive module to the second transmit and receive module, and sending a selected high band diversity receive module to a transceiver, the selected high band diversity receive module chosen from a plurality of high band diversity receive signals including the first high band diversity receive signal and the second high band diversity receive signal.

In some implementations, the method further comprises providing the second mid band diversity receive signal from the second transmit and receive module to the first transmit and receive module, and sending a selected mid band diversity receive module to a transceiver, the selected mid band diversity receive module chosen from a plurality of mid band diversity receive signals including the first mid band diversity receive signal and the second mid band diversity receive signal.

In some implementations, the method further comprises providing four-by-four receive multi-input and multi-output communications using the first transmit and receive module, the second transmit and receive module, the first diversity module, and the second diversity module.

In some implementations, the present disclosure relates to a radio frequency front end system for a wireless device. The radio frequency front end system may comprise a first antenna terminal and a first transmit and receive module electrically coupled to the first antenna terminal. The first transmit and receive module may be operable to provide a high band transmit signal to the first antenna terminal and to receive a first high band receive signal and a first mid band receive signal from the first antenna terminal. The first high band receive signal may have a frequency content that is greater than a frequency content of the first mid band receive signal. The radio frequency front end system may further comprise a second antenna terminal and a second transmit and receive module electrically coupled to the second antenna terminal. The second transmit and receive module may be operable to provide a mid band transmit signal to the second antenna terminal and to receive a second mid band receive signal and a second high band receive signal from the second antenna terminal. The second high band receive signal may have a frequency content that is greater than a frequency content of the second mid band receive signal.

In some implementations, the present disclosure relates to a radio frequency front end system for a wireless device. The radio frequency front end system may comprise a first antenna terminal and a first transmit and receive module electrically coupled to the first antenna terminal. The first transmit and receive module may be operable to provide a high band transmit signal to the first antenna terminal and to receive a first high band receive signal and a first mid band receive signal from the first antenna terminal. The first high band receive signal may have a frequency range that is greater than a frequency range of the first mid band receive signal. The radio frequency front end system may further comprise a second antenna terminal and a second transmit and receive module electrically coupled to the second antenna terminal. The second transmit and receive module may be operable to provide a mid band transmit signal to the second antenna terminal and to receive a second mid band receive signal and a second high band receive signal from the second antenna terminal. The second high band receive signal may have a frequency range that is greater than a frequency range of the second mid band receive signal.

In some embodiments, the first high band receive signal and the second high band receive signal are operable to support downlink multi-input and multi-output communications. In some embodiments, the first mid band receive signal and the second mid band receive signal are operable to support downlink multi-input and multi-output communications.

In some embodiments, the first high band receive signal and the first mid band receive signal are operable to support carrier aggregation. In some embodiments, the first mid band receive signal and the first high band receive signal are operable to support carrier aggregation.

In some embodiments, the first transmit and receive module is electrically coupled to the first antenna terminal without an intervening frequency multiplexer. In some embodiments, the first transmit and receive module is electrically coupled to the first antenna terminal without an intervening multiband handling element.

In some embodiments, the first transmit and receive module includes a first plurality of high band signal paths and a first plurality of mid band signal paths that are switch coupled to the first antenna terminal.

In some embodiments, the second transmit and receive module includes a second plurality of high band signal paths and a second plurality of mid band signal paths that are switch coupled to the second antenna terminal.

In some embodiments, the second transmit and receive module is electrically coupled to the second antenna terminal via a diplexer.

In some embodiments, the radio frequency front end system further comprises a third transmit and receive module electrically coupled to the second antenna terminal via the diplexer, the third transmit and receive module configured to provide a low band transmit signal to the second antenna terminal and to receive a low band receive signal from the second antenna terminal.

In some embodiments, the radio frequency front end system further comprises a first diversity antenna terminal and a first diversity module configured to receive a first high band diversity receive signal and a first mid band diversity receive signal from the first diversity antenna terminal.

In some embodiments, the radio frequency front end system further comprises a second diversity antenna terminal and a second diversity module configured to receive a second mid band diversity receive signal and a second high band receive signal from the second diversity antenna terminal.

In some embodiments, the frequency contents of the mid band transmit signal, the first mid band receive signal, and the second mid band receive signal of the radio frequency front end system are between 1 GHz and 2.3 GHz, and the frequency contents of the high band transmit signal, the first high band receive signal, and the second high band receive signal are greater than 2.3 GHz. In some embodiments, the mid band transmit signal, the first mid band receive signal, and the second mid band receive signal of the radio frequency front end system have frequencies between 1 GHz and 2.3 GHz, and the high band transmit signal, the first high band receive signal, and the second high band receive signal have frequencies greater than 2.3 GHz.

In some implementations, the present disclosure relates to a wireless device comprising a first antenna and a first transmit and receive module operable to provide a high band transmit signal to the first antenna and to receive a first high band receive signal and a first mid band receive signal from the first antenna without an intervening multiband handling element. The first high band receive signal may have a frequency range that is greater than a frequency range of the first mid band receive signal. The wireless device may further comprise a second antenna and a second transmit and receive module operable to provide a mid band transmit signal to the second antenna and to receive a second mid band receive signal and a second high band receive signal from the second antenna. The second high band receive signal may have a frequency range that is greater than a frequency range of the second mid band receive signal.

In some embodiments, the radio frequency front end system of the wireless device further includes a diplexer electrically coupled between the second transmit and receive module and the second antenna.

In some embodiments, the radio frequency front end system of the wireless device further includes a third transmit and receive module electrically coupled to the second antenna via the diplexer, the third transmit and receive module configured to provide a low band transmit signal to the second antenna and to receive a low band receive signal from the second antenna.

In some embodiments, the first high band receive signal and the second high band receive signal are operable to support downlink multi-input and multi-output communications. In some embodiments, the first mid band receive signal and the second mid band receive signal are operable to support downlink multi-input and multi-output communications.

In some embodiments, the first high band receive signal and the first mid band receive signal are operable to support carrier aggregation. In some embodiments, the second mid band receive signal and the second high band receive signal are operable to support carrier aggregation.

In some embodiments, the first transmit and receive module of the wireless device includes a first plurality of high band signal paths and a first plurality of mid band signal paths that are switch coupled to the first antenna. In some embodiments, the second transmit and receive module of the wireless device includes a second plurality of high band signal paths and a second plurality of mid band signal paths that are switch coupled to the second antenna.

In some embodiments, the mid band transmit signal, the first mid band receive signal, and the second mid band receive signal have frequencies between 1 GHz and 2.3 GHz, and the high band transmit signal, the first high band receive signal, and the second high band receive signal have frequencies greater than 2.3 GHz.

DETAILED DESCRIPTION OF SOME EMBODIMENTS

Figure 1:
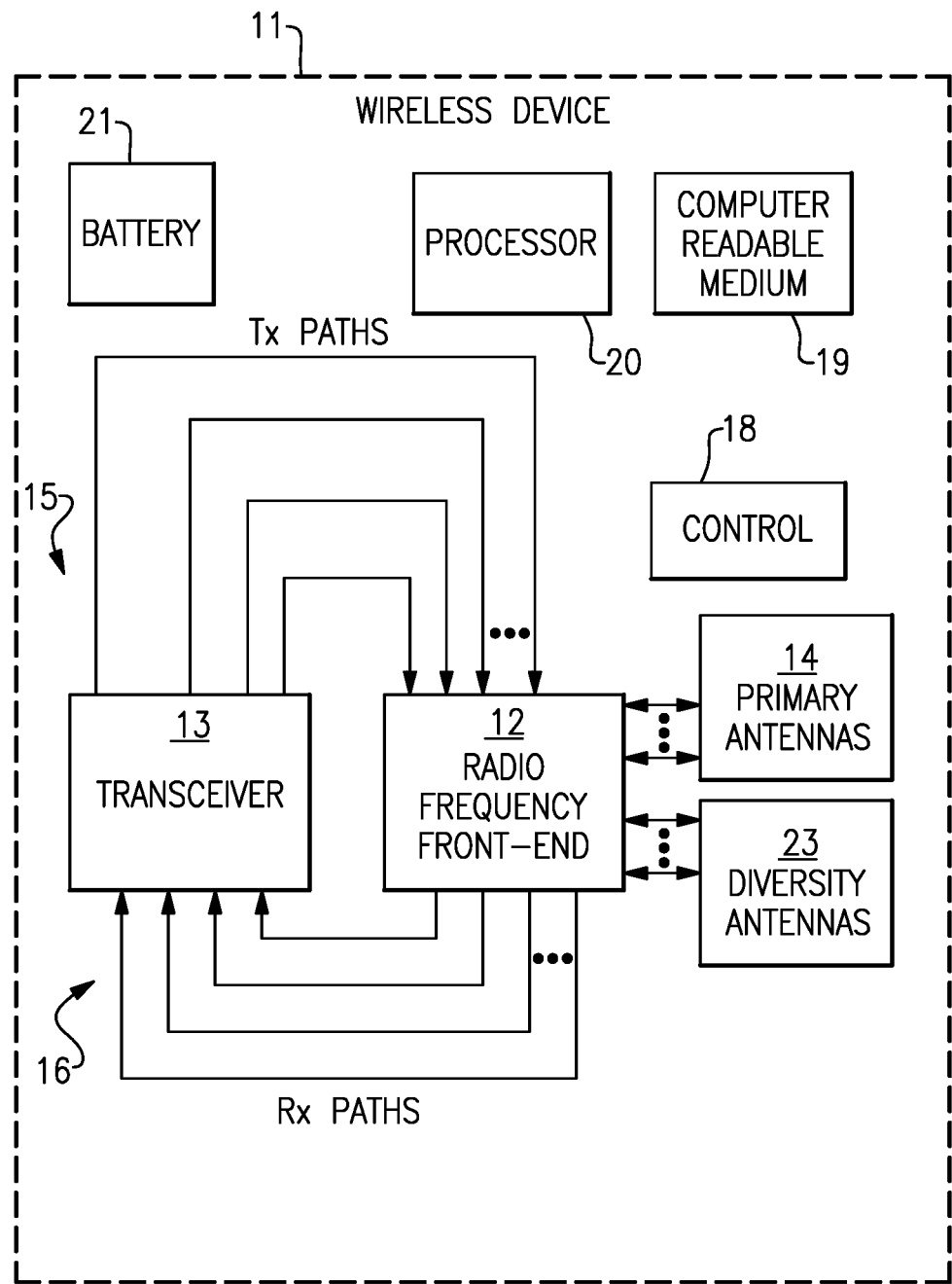
FIG. 1 is a schematic block diagram of a wireless device, according to some embodiments of the present disclosure.

The headings provided herein, if any, are for convenience only and do not necessarily affect the scope or meaning of the claimed invention.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A radio frequency (RF) device can include multiple antennas for supporting communications. Additionally, the RF device can include a radio frequency front end (RFFE) system for processing signals received from and transmitted to the antennas. The RFFE system can provide a number of functions, including, but not limited to, signal filtering, controlling component connectivity to the antennas, and/or signal amplification.

RFFE systems can be used to handle RF signals of a wide variety of types, including, but not limited to, wireless local area network (WLAN) signals, Bluetooth signals, and/or cellular signals. Additionally, RFFE systems can be used to process signals of a wide range of frequencies. For example, certain RFFE systems can operate using one or more low bands (for example, RF signal bands having a frequency of 1 GHz or less), one or more mid bands (for example, RF signal bands having a frequency between 1 GHz and 2.3 GHz), and one or more high bands (for example, RF signal bands having a frequency greater than 2.3 GHz). RFFE systems can be used in a wide variety of RF devices, including, but not limited to, smartphones, base stations, laptops, handsets, wearable electronics, and/or tablets.

An RFFE can be implemented to support a variety of features that enhance bandwidth and/or other performance characteristics of an RF device.

In one example, an RFFE system is implemented to support carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels, for instance up to five carriers. Carrier aggregation includes contiguous aggregation, in which contiguous carriers within the same operating frequency band are aggregated. Carrier aggregation can also be non-contiguous, and can include carriers separated in frequency within a common band or in different bands.

In another example, an RFFE system is implemented to support multi-input and multi-output (MIMO) communications to increase throughput and enhance mobile broadband service. MIMO communications use multiple antennas for communicating multiple data streams over a single radio frequency channel. MIMO communications benefit from higher signal to noise ratio, improved coding, and/or reduced signal interference due to spatial multiplexing differences of the radio environment.

MIMO order refers to a number of separate data streams sent or received. For instance, a MIMO order for downlink communications can be described by a number of transmit antennas of a base station and a number of receive antennas for user equipment (UE), such as a mobile device. For example, two-by-two (2×2) RX MIMO (also referred to herein as second order receive MIMO) refers to MIMO downlink communications using two base station antennas and two UE antennas. Additionally, four-by-four (4×4) RX MIMO (also referred to herein as fourth order receive MIMO) refers to MIMO downlink communications using four base station antennas and four UE antennas.

RFFE systems that support carrier aggregation and multi-order MIMO can be used in RF devices that operate with wide bandwidth. For example, such RFFE systems can be used in applications servicing multimedia content streaming at high data rates.

Apparatus and methods for RFFE systems are provided herein. In certain implementations, an RFFE system includes a first transmit and receive module that transmits and receives high band (HB) signals from a first antenna and receives mid band (MB) signals from the first antenna, and a second transmit and receive module that transmits and receives MB signals from a second antenna and receives HB signals from the second antenna. Accordingly, the first transmit and receive module operates as an HB TX/RX+MB RX module that provides HB transmit and receive functionality and MB receive functionality, and the second transmit and receive module operates as an MB TX/RX+HB RX module that provides MB transmit and receive functionality and HB receive functionality.

Implementing the RFFE system in this manner can provide a number of advantages. For example, certain types of carrier aggregation can be provided without needing to activate both the HB TX/RX+MB RX module and the MB TX/RX+HB RX module. In one example, when transmitting on Band 1 and performing downlink carrier aggregation using Band 1 and Band 7, the MB TX/RX+HB RX module can support such communications without needing to activate the HB TX/RX+MB RX module. In another example, when transmitting on Band 7 and performing downlink carrier aggregation using Band 7 and Band 1, the HB TX/RX+MB RX module can support such communications without needing to activate the MB TX/RX+HB RX module. Accordingly, carrier aggregation can be realized with relatively low power.

In certain implementations, the HB TX/RX+MB RX module is connected to the first antenna without an intervening multiband handling element, such as a diplexer or triplexer. In some embodiments, a multiband handling element is referred to (including herein) as a frequency multiplexer. Additionally, the MB TX/RX+HB RX module is connected to a second antenna through a diplexer that provides shared access of the second antenna to a low band (LB) module.

By implementing the RFFE system in this manner, excellent performance can be obtained when transmitting and receiving HB signals, including when using HB+MB carrier aggregation and a HB primary communication carrier (PCC). Additionally, MB and LB performance is superior relative to an implementation using a triplexer, which exhibits more loss relative to a diplexer. Accordingly, certain embodiments herein have relatively low insertion loss in transmit and/or receive paths, which in turn enhances performance.

The RFFE systems herein can also exhibit excellent performance when carrier aggregation and/or MIMO functionality is disabled. For instance, receive filters associated with downlink carrier aggregation and/or MIMO can be switch combined such that they are not present in a signal path when operating using a single frequency carrier. Accordingly, certain embodiments herein not only can be used to provide an RF device with high performance carrier aggregation and 4×4 RX MIMO, but also robust single carrier performance when the RF device operates with carrier aggregation and MIMO features disabled.

FIG. 1 is a schematic block diagram of one example of a wireless or mobile device 11. The mobile device 11 can include an RFFE system implementing one or more features of the present disclosure.

The example mobile device 11 depicted in FIG. 1 can represent a multi band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824 849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, 22 or more radio frequency spectrum bands.

Transmit and receive modules of the present disclosure can be used within a mobile device implementing the foregoing example modes and/or bands, and in other communication standards. For example, 3G, 4G, LTE, and Advanced LTE are non-limiting examples of such standards.

In the illustrated embodiment, the mobile device 11 includes an RFFE system 12, a transceiver 13, primary antennas 14, a control component 18, a computer readable medium 19, a processor 20, a battery 21, and diversity antennas 23.

The transceiver 13 can generate RF signals for transmission via the primary antennas 14 and/or the diversity antennas 23. Furthermore, the transceiver 13 can receive incoming RF signals from the primary antennas 14 and/or the diversity antennas 23. It will be understood that various functionalities associated with transmitting and receiving of RF signals can be achieved by one or more components that are collectively represented in FIG. 1 as the transceiver 13. For example, a single component can be configured to provide both transmitting and receiving functionalities. In another example, transmitting and receiving functionalities can be provided by separate components.

In FIG. 1, one or more output signals from the transceiver 13 are depicted as being provided to the RFFE system 12 via one or more transmission paths 15. In the example shown, different transmission paths 15 can represent output paths associated with different bands and/or different power outputs. For instance, the two different paths shown can represent paths associated with different power outputs (e.g., low power output and high power output), and/or paths associated with different bands. Although FIG. 1 illustrates a configuration using two transmission paths 15, the mobile device 11 can be adapted to include more or fewer transmission paths 15.

In FIG. 1, one or more receive signals are depicted as being provided from the RFFE system 12 to the transceiver 13 via one or more receiving paths 16. In the example shown, different receiving paths 16 can represent paths associated with different bands. For example, the four example paths 16 shown can represent quad band capability that some mobile devices are provided with. Although FIG. 1 illustrates a configuration using four receiving paths 16, the mobile device 11 can be adapted to include more or fewer receiving paths 16.

As shown in FIG. 1, the RFFE system 12 controls communications between the transceiver 13 and the device's primary antennas 14 and diversity antennas 23. The RFFE system 12 can provide a number of functionalities associated with, for example, MIMO communications, switching between different bands, carrier aggregation, switching between different power modes, filtering of signals, duplexing of signals, and/or some combination thereof.

The illustrated control component 18 can be provided for controlling various control functionalities associated with operations of the RFFE system 12 and/or other operating component(s). For example, the control component 18 can provide control signals to the RRFE 12 to control electrical connectivity to the primary antennas 14 and/or diversity antennas 23, for instance, by setting states of switches.

In certain embodiments, the processor 20 can be configured to facilitate implementation of various processes on the mobile device 11. The processor 20 can be a general purpose computer, special purpose computer, or other programmable data processing apparatus. In certain implementations, the mobile device 11 can include a computer readable memory 19, which can include computer program instructions that may be provided to and executed by the processor 20.

The battery 21 can be any suitable battery for use in the mobile device 11, including, for example, a lithium-ion battery.

The illustrated mobile device 11 includes the diversity antennas 23, which can help improve the quality and reliability of a wireless link relative to a configuration in which a mobile device only includes primary antennas. For example, including the diversity antennas 23 can reduce line of sight losses and/or mitigate the impacts of phase shifts, time delays, and/or distortions associated with signal interference of the primary antennas 14. Thus, the transceiver 13 processes the signals received by the primary antennas 14 and diversity antennas 23 to obtain a receive signal of higher energy and/or improved fidelity relative to a configuration using only primary antennas.

The RFFE system 12 of FIG. 1 can be implemented in accordance with one or more features of the present disclosure. Although the wireless device 11 illustrates one example of an RF device that can include an RFFE system implemented in accordance with the present disclosure, the teachings herein are applicable to a wide variety of RF devices. Accordingly, RFFE systems can be used in other implementations of RF devices.

Figure 2A:
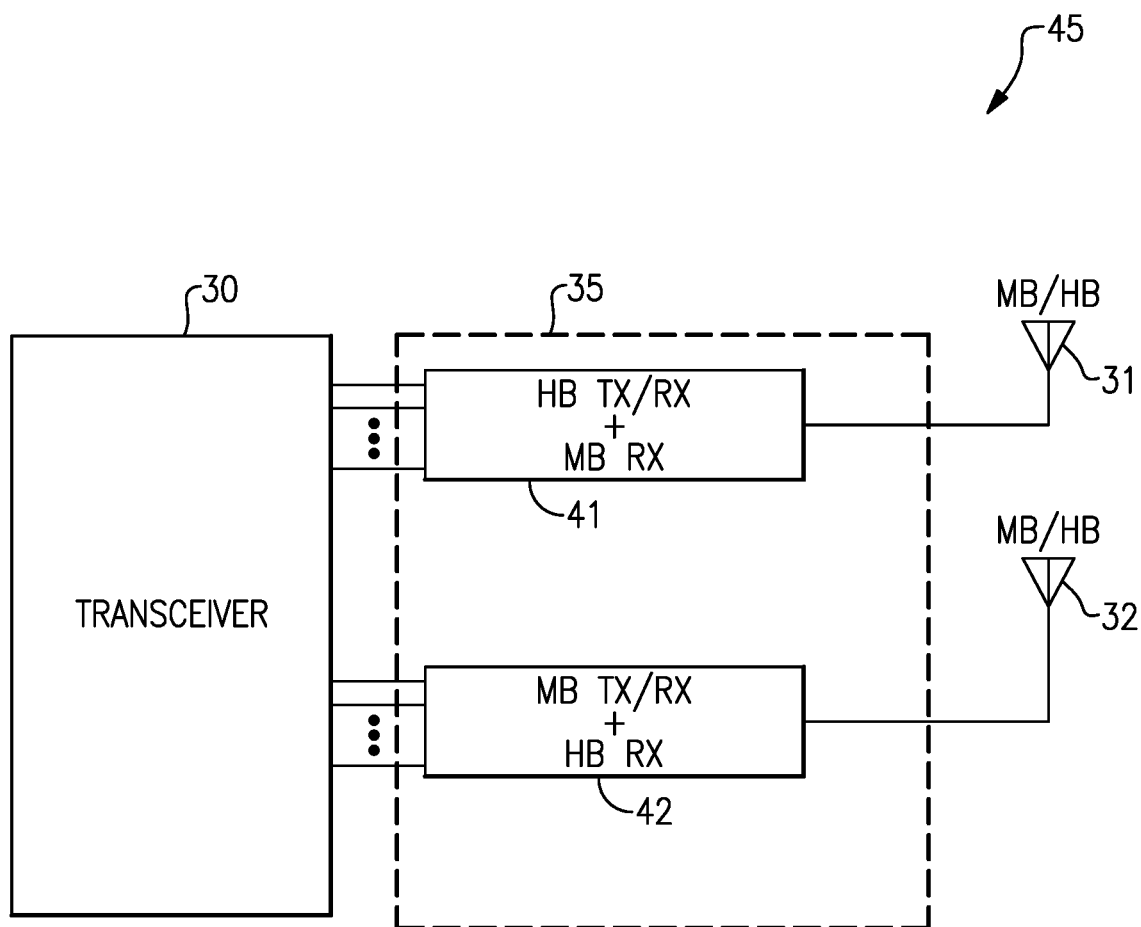
FIG. 2A is a schematic block diagram of a radio frequency (RF) system according to one embodiment.

FIG. 2A is a schematic block diagram of an RF system or device 45 according to one embodiment. The RF system 45 includes a transceiver 30, a first antenna 31, a second antenna 32, and an RFFE system 35. The RFFE system 35 includes an HB TX/RX+MB RX module 41 and an MB TX/RX+HB RX module 42.

Although FIG. 2A illustrates one embodiment of an RF system implemented in accordance with the teachings herein, other implementations are possible, including, but not limited to, implementations including additional antennas, modules, and/or other circuitry.

The illustrated RF system 45 is used to transmit and receive signals of a wide variety of frequency bands, including MB and HB signals. For example, the RF system 45 can process one or more MB signals having a frequency between 1 GHz and 2.3 GHz, and one or more HB signals having a frequency greater than 2.3 GHz. Examples of MB frequencies include, but are not limited to, Band 1, Band 3, and Band 4. Examples of HB frequencies include, but are not limited to, Band 7, Band 38, and Band 41.

In the illustrated embodiment, the HB TX/RX+MB RX module 41 is electrically coupled to the first antenna 31, which is implemented to handle MB and HB signals. The HB TX/RX+MB RX module 41 is further coupled to the transceiver 30 via RF signal routes or paths. Additionally, the HB TX/RX+MB RX module 41 provides both HB transmit and receive functionality and MB receive functionality.

As shown in FIG. 2A, the MB TX/RX+HB RX module 42 is electrically coupled to the second antenna 32, which is implemented to handle MB and HB signals, in this embodiment. The MB TX/RX+HB RX module 42 is further coupled to the transceiver 30 via various RF signal routes. Additionally, the MB TX/RX+HB RX module 42 provides both MB transmit and receive functionality and HB receive functionality.

The RFFE system 35 can provide certain types of carrier aggregation without needing to activate both the HB TX/RX+MB RX module 41 and the MB TX/RX+HB RX module 42. For instance, when the RF system 45 operates using Band 1 or another MB as a primary communication carrier (PCC), the RF system 45 can transmit and receive Band 1 signals using the MB TX/RX+HB RX module 42. Additionally, the RFFE system 35 can provide downlink carrier aggregation using Band 7 or another HB without needing to activate the HB TX/RX+MB RX module 41. Accordingly, certain types of carrier aggregation can be realized with relatively low power.

In the illustrated embodiment, the HB TX/RX+MB RX module 41 is connected to the first antenna 31 without an intervening multiband handling element, such as a diplexer or triplexer. A multiband handling element is also referred to herein as a frequency multiplexer. By implementing the RF system 45 in this manner, excellent performance can be obtained when transmitting and receiving HB signals, including when using HB+MB carrier aggregation.

The illustrated RF system 45 supports downlink MIMO for both HB and MB. Although the RF system 45 of FIG. 2A includes two antennas for receiving HB and MB signals, the RF system 45 can be adapted to include additional antennas to provide MIMO of higher order. In one example, diversity antennas and modules are included to support 4×4 RX MIMO for MB and HB signals.

Accordingly, the RF system 45 of FIG. 2A supports carrier aggregation and MIMO functionality.

Figure 2B:
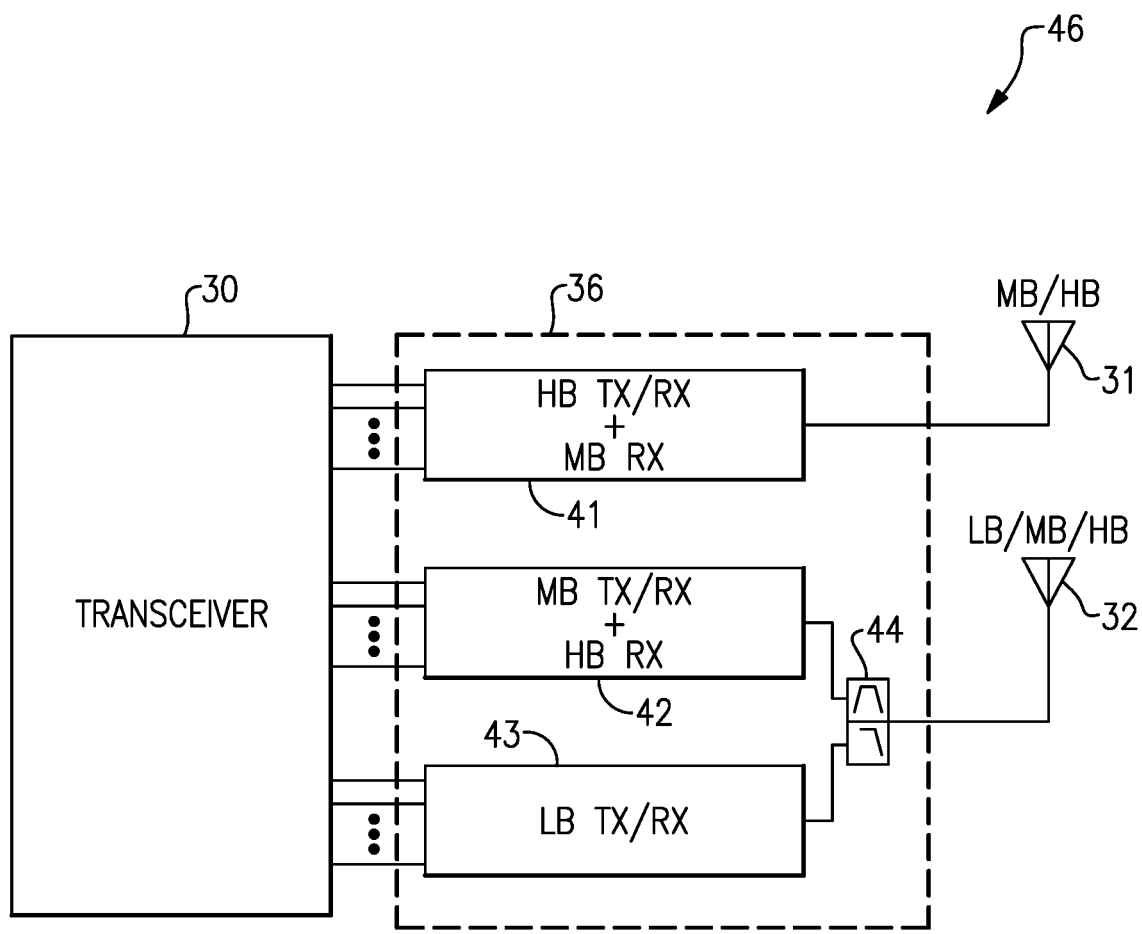
FIG. 2B is a schematic block diagram of an RF system according to another embodiment.

FIG. 2B is a schematic block diagram of an RF system or device 46 according to one embodiment. The RF system 46 includes a transceiver 30, a first antenna 31, a second antenna 32, and an RFFE system 36. The RFFE system 36 includes an HB TX/RX+MB RX module 41, an MB TX/RX+HB RX module 42, and an LB TX/RX module 43, and a diplexer 44.

Although FIG. 2B illustrates one embodiment of an RF system implemented in accordance with the teachings herein, other implementations are possible, including, but not limited to, implementations including additional antennas, modules, and/or other circuitry.

The illustrated RF system 46 is used to transmit and receive signals of a wide variety of frequency bands, including LB, MB, and HB signals. For example, the RF system 46 can process one or more LB signals having a frequency of 1 GHz or less, one or more MB signals having a frequency between 1 GHz and 2.3 GHz, and one or more HB signals having a frequency greater than 2.3 GHz. Examples of LB frequencies include, but are not limited to Band 8, Band 20, and Band 26. Examples of MB frequencies include, but are not limited to, Band 1, Band 3, and Band 4. Examples of HB frequencies include, but are not limited to, Band 7, Band 38, and Band 41.

In the illustrated embodiment, the HB TX/RX+MB RX module 41 is electrically coupled to the first antenna 31, which is implemented to handle MB and HB signals. The HB TX/RX+MB RX module 41 is further coupled to the transceiver 30 via RF signal routes or paths. Additionally, the HB TX/RX+MB RX module 41 provides both HB transmit and receive functionality and MB receive functionality.

As shown in FIG. 2B, the MB TX/RX+HB RX module 42 is electrically coupled to the second antenna 32, which is implemented to handle LB, MB, and HB signals, in this embodiment. The MB TX/RX+HB RX module 42 is further coupled to the transceiver 30 via various RF signal routes. Additionally, the MB TX/RX+HB RX module 42 provides both MB transmit and receive functionality and HB receive functionality.

The RFFE system 36 can provide certain types of carrier aggregation without needing to activate both the HB TX/RX+MB RX module 41 and the MB TX/RX+HB RX module 42. For instance, when the RF system 46 operates using Band 1 or another MB as a PCC, the RF system 46 can transmit and receive Band 1 signals using the MB TX/RX+HB RX module 42. Additionally, the RFFE system 36 can provide downlink carrier aggregation using Band 7 or another HB without needing to activate the HB TX/RX+MB RX module 41. Accordingly, certain types of carrier aggregation can be realized with relatively low power.

In the illustrated embodiment, the HB TX/RX+MB RX module 41 is connected to the first antenna 31 without an intervening multiband handling element. By implementing the RF system 46 in this manner, excellent performance can be obtained when transmitting and receiving HB signals, including when using HB+MB carrier aggregation.

As shown in FIG. 2B, the MB TX/RX+HB RX module 42 and the LB TX/RX module 43 are electrically coupled to the second antenna 32 via the diplexer 44. Since a diplexer is lower loss relative to a triplexer, the RF system 46 of FIG. 2B exhibits superior MB and LB performance relative to an implementation using a triplexer.

The illustrated RF system 46 supports downlink MIMO for both HB and MB. Although the RF system 46 of FIG. 2B includes two antennas for receiving HB and MB signals, the RF system 46 can be adapted to include additional antennas to provide MIMO of higher order. In one example, diversity antennas and modules are included to support 4×4 RX MIMO for MB and HB signals.

Accordingly, the RF system 46 of FIG. 2B supports carrier aggregation and MIMO functionality.

Figure 2C:
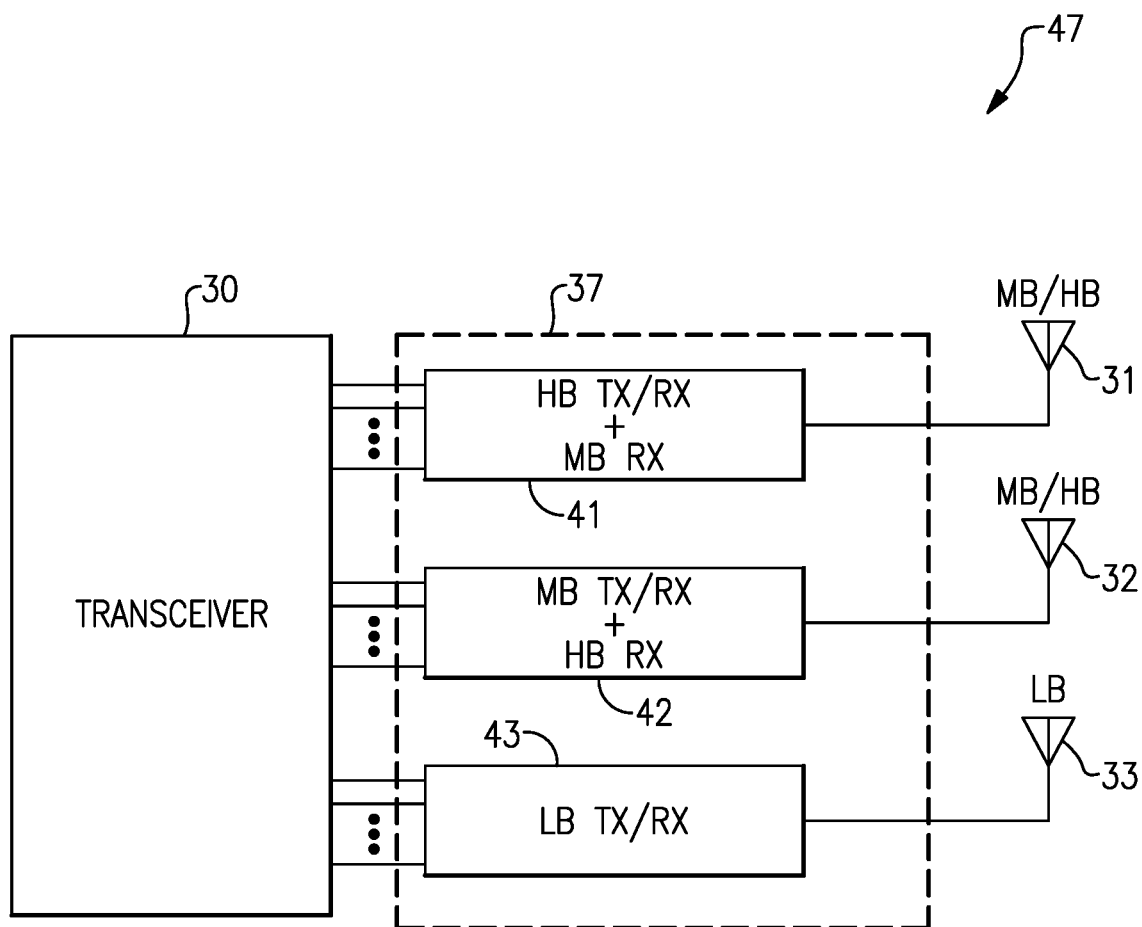
FIG. 2C is a schematic block diagram of an RF system according to another embodiment.

FIG. 2C is a schematic block diagram of an RF system 47 according to another embodiment. The RF system 47 includes a transceiver 30, a first antenna 31, a second antenna 32, a third antenna 33, and an RFFE system 37. The RFFE system 37 includes an HB TX/RX+MB RX module 41, an MB TX/RX+HB RX module 42, and an LB TX/RX module 43.

The RF system 47 of FIG. 2C is similar to the RF system 46 of FIG. 2B, except that the RF system 47 omits the diplexer 44 of FIG. 2B in favor of including the third antenna 33 for LB communications.

Figure 3:
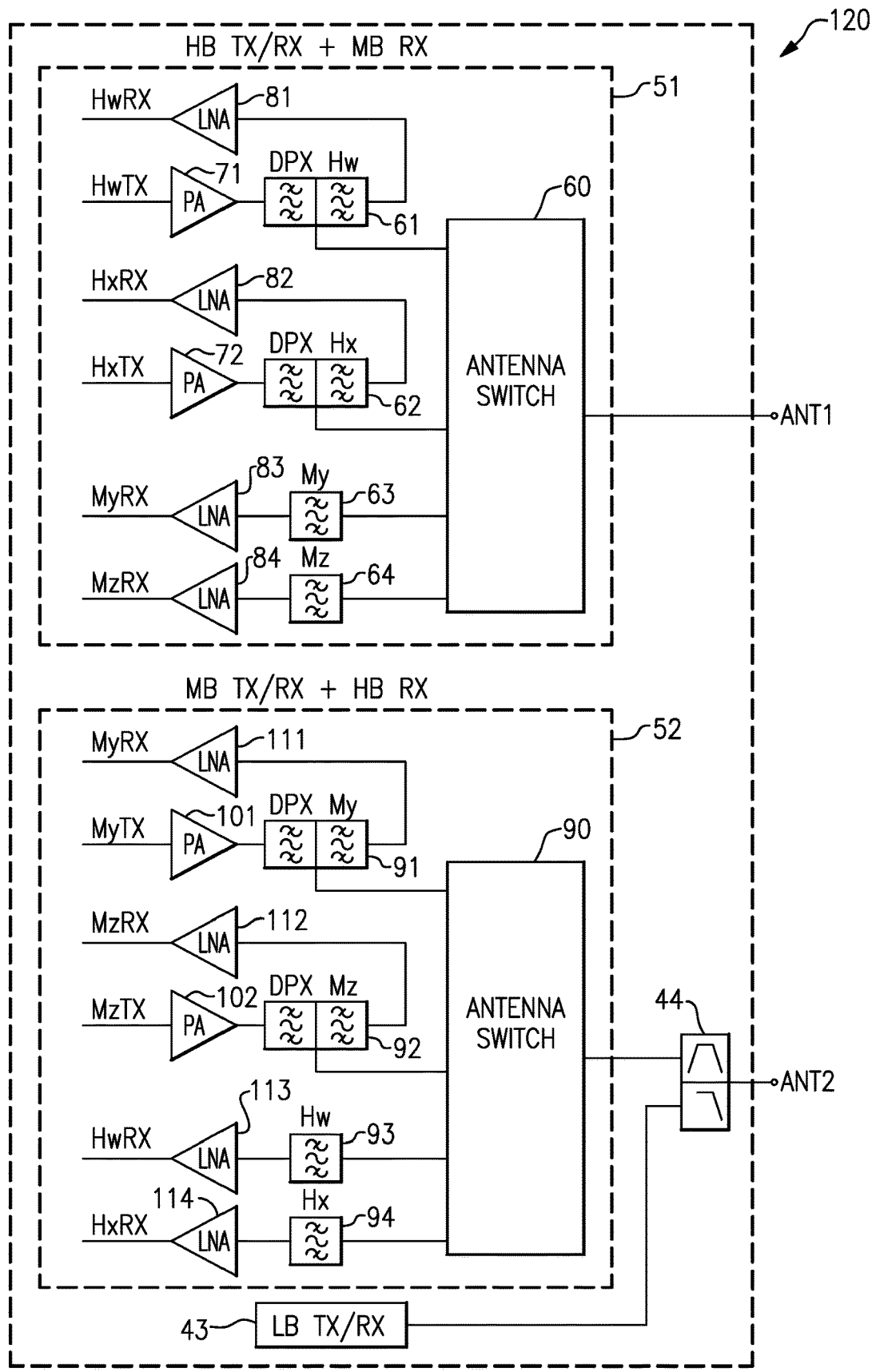
FIG. 3 is a schematic block diagram of a radio frequency front end (RFFE) system, according to some embodiments of the present disclosure.

FIG. 3 is a schematic block diagram of one embodiment of an RFFE system 120. The RFFE system 120 includes an HB TX/RX+MB RX module 51, an MB TX/RX+HB RX module 52, an LB TX/RX module 43, and a diplexer 44.

The HB TX/RX+MB RX module 51 includes an antenna switch 60, a first HB duplexer 61, a second HB duplexer 62, a first MB filter 63, a second MB filter 64, a first HB power amplifier (PA) 71, a second HB PA 72, a first HB low noise amplifier (LNA) 81, a second HB LNA 82, a first MB LNA 83, and a second MB LNA 84. The antenna switch 60 can be used to couple the first antenna terminal ANT1 to one or more of filters and/or duplexers of the HB TX/RX+MB RX module 51.

The MB TX/RX+HB RX module 52 includes an antenna switch 90, a first MB duplexer 91, a second MB duplexer 92, a first HB filter 93, a second HB filter 94, a first MB PA 101, a second MB PA 102, a first MB LNA 111, a second MB LNA 112, a first HB LNA 113, and a fourth HB LNA 114. The antenna switch 90 can be used to couple the second antenna terminal ANT2 to one or more of filters and/or duplexers of MB TX/RX+HB RX module 52.

Although specific implementations of HB and MB processing circuitry are shown, the teachings herein are applicable to HB and MB processing circuitry implemented in a wide variety of ways. Accordingly, other implementations are possible.

In the illustrated embodiment, the HB TX/RX+MB RX module 51 receives a first HB transmit signal HwTX and a second HB transmit signal HxTX, and generates a first HB receive signal HwRX, a second HB receive signal HxRX, a first MB receive signal MyRX, and a second MB receive signal MzRX. Additionally, the MB TX/RX+HB RX module 52 receives a first MB transmit signal MyTX and a second MB transmit signal MzTX, and generates a first HB receive signal HwRX, a second HB receive signal HxRX, a first MB receive signal MyRX, and a second MB receive signal MzRX.

Although one example, of transmit and receive modules is shown, other implementations are possible, including, for example, implementations in which the modules generate more or fewer transmit and/or receive signals and/or signals of other bands. For example, more or fewer HB and/or MB signal paths can be included to provide support for a desired number of frequency bands.

For clarity of the figures, signals generated and received by the LB TX/RX module 43 have been omitted. Additionally, control signals (for instance, switch state control signals and amplifier control signals, such as enable signals) have been omitted from FIG. 3 for clarity.

The illustrated RFFE system 120 supports carrier aggregation and MIMO functionality.

For example, the HB TX/RX+MB RX module 51 supports downlink carrier aggregation using a primary component carrier (PCC) HB and secondary component carrier (SCC) MB. For instance, the antenna switch 60 can be used to switch combine a desired HB duplexer and MB filter. Additionally, the MB TX/RX+HB RX module 52 supports downlink carrier aggregation using PCC MB and SCC HB. For instance, the antenna switch 90 can be used to switch combine a desired MB duplexer and HB filter.

Switch combining the duplexers and filters can enhance performance when using a single frequency carrier. For example, when carrier aggregation functionality is disabled, the unused components can be removed from the active signal path, thereby reducing path loss.

The RFFE system 120 of FIG. 3 also supports high order downlink MIMO while providing flexibility in choice for the PCC that is used for transmissions.

In a first example, both MB MIMO and transmission using PCC MB is provided by using a desired MB duplexer of module 52 and a desired MB filter of module 51.

In a second example, both HB MIMO and transmission using PCC MB is provided by using a desired MB duplexer of module 52, a desired HB filter of module 52, and a desired HB duplexer of module 51.

In a third example, both MB MIMO and transmission using PCC HB is provided by using a desired HB duplexer of module 51, a desired MB filter of module 51, and a desired MB duplexer of module 52.

In a fourth example, both HB MIMO and transmission using PCC HB is provided by using a desired HB duplexer of module 51 and a desired HB filter of the module 52.

Accordingly, the illustrated RFFE system 120 exhibits a high amount of flexibility for carrier aggregation and MIMO support. Additionally, the receive filters can be switched combined when downlink carrier aggregation and MIMO functionality is needed, thereby providing robust single carrier transmit and receive performance.

Figure 4:
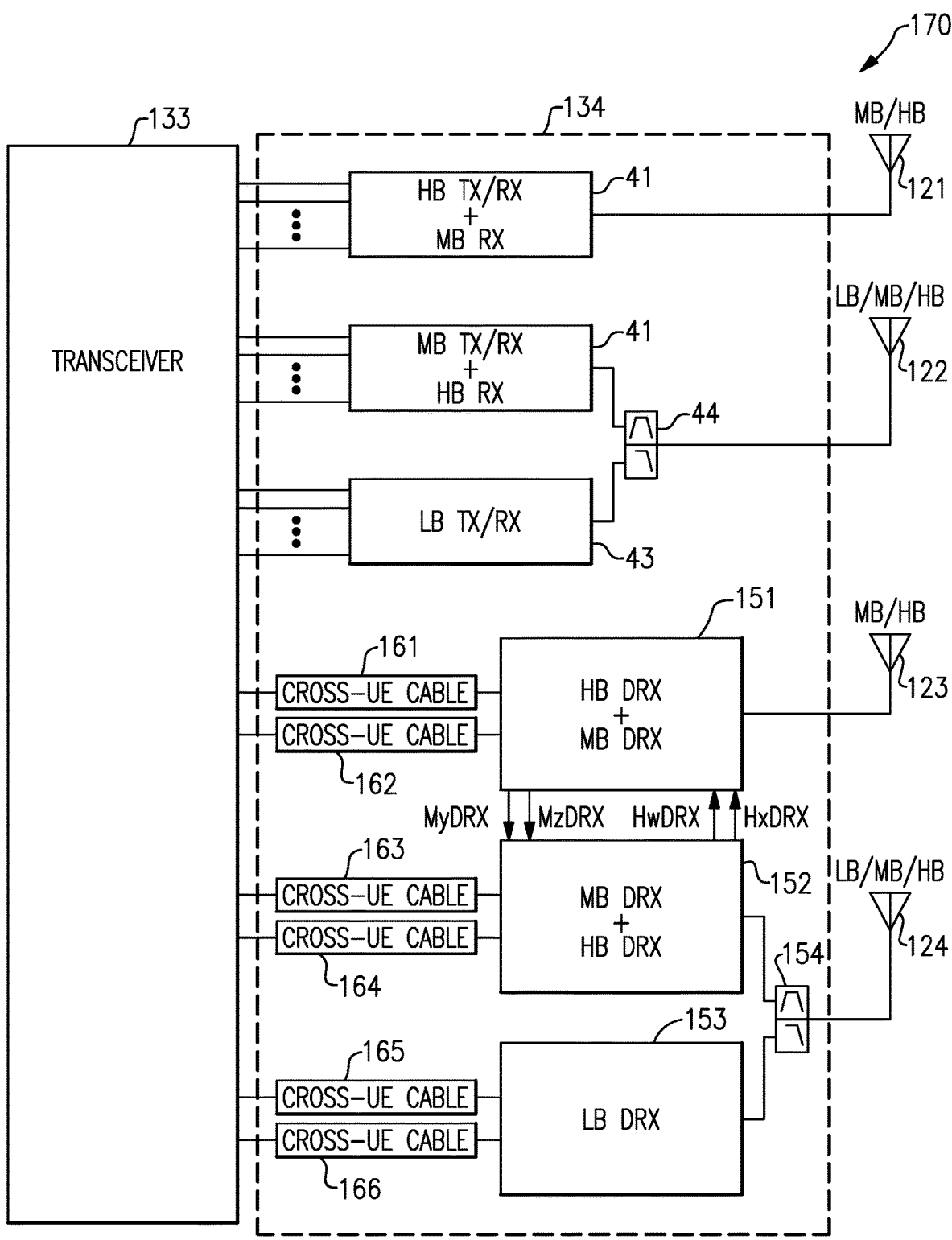
FIG. 4 is a schematic block diagram of an RF system, according to some embodiments of the present disclosure.

FIG. 4 is a schematic block diagram of an RF system 170 according to another embodiment. The RF system 170 includes a first primary antenna 121, a second primary antenna 122, a first diversity antenna 123, a second diversity antenna 124, a transceiver 133, and an RFFE system 134. The RFFE system 134 includes an HB TX/RX+MB RX module 41, an MB TX/RX+HB RX module 42, an LB TX/RX module 43, a diplexer 44, an HB DRX+MB DRX diversity module 151, an MB DRX+HB DRX diversity module 152, an LB DRX diversity module 153, a diversity diplexer 154, and cross-UE cables 161-166.

The RF system 170 of FIG. 4 is similar to the RF system 50 of FIG. 2, except that the RF system 170 further includes circuitry and antennas for diversity communications.

For example, the HB DRX+MB DRX diversity module 151 is used for receiving HB diversity receive signals and/or MB diversity receive signals from the first diversity antenna 123. Additionally, the MB DRX+HB DRX diversity module 152 is used for receiving MB diversity receive signals and/or HB diversity receive signals from the second diversity antenna 124 via the diversity diplexer 154. Furthermore, the LB DRX diversity module 153 is used for receive LB diversity receive signals from the second diversity antenna 124 via the diversity diplexer 154.

The illustrated diversity modules 151-153 are connected to the transceiver 133 via the cross-UE cables 161-166. To reduce the correlation between received signals, the primary antennas 121-122 and the diversity antennas 123-124 can be separated by a relatively large physical distance in the RF system 170. For example, the diversity antennas 123-124 can be positioned near the top of the device and the primary antennas 121-122 can be positioned near the bottom of the device or vice-versa. Additionally, the transceiver 133 can be positioned near the primary antennas 121-122 and modules 141-143 to enhance performance of primary communications.

Accordingly, in certain implementations, the diversity modules 151-153 are relatively far from the transceiver 133, and the cross-UE cables 161-166 are used to provide received diversity signals to the transceiver 133.

In the illustrated embodiment, the HB DRX+MB DRX diversity module 151 provides MB diversity receive signals MyDRX and MzDRX to the MB DRX+HB DRX diversity module 152, which controls which MB diversity receive signals are provided to the transceiver 133 via the cross-UE cables 163-164. Additionally, the MB DRX+HB DRX module 152 provides HB diversity receive signals HwDRX and HxDRX to the HB DRX+MB DRX module 151, which controls which HB diversity receive signals are provided to the transceiver 133 via the cross-UE cables 161-162.

By implementing the diversity modules in this manner, a number of cross-UE cables can be reduced relative to a configuration using a dedicated cross-UE cable per diversity receive signal. Thus, routing congestion and/or a number of RF signal routes between the diversity modules 151-153 and the transceiver 133 can be reduced.

Figure 5:
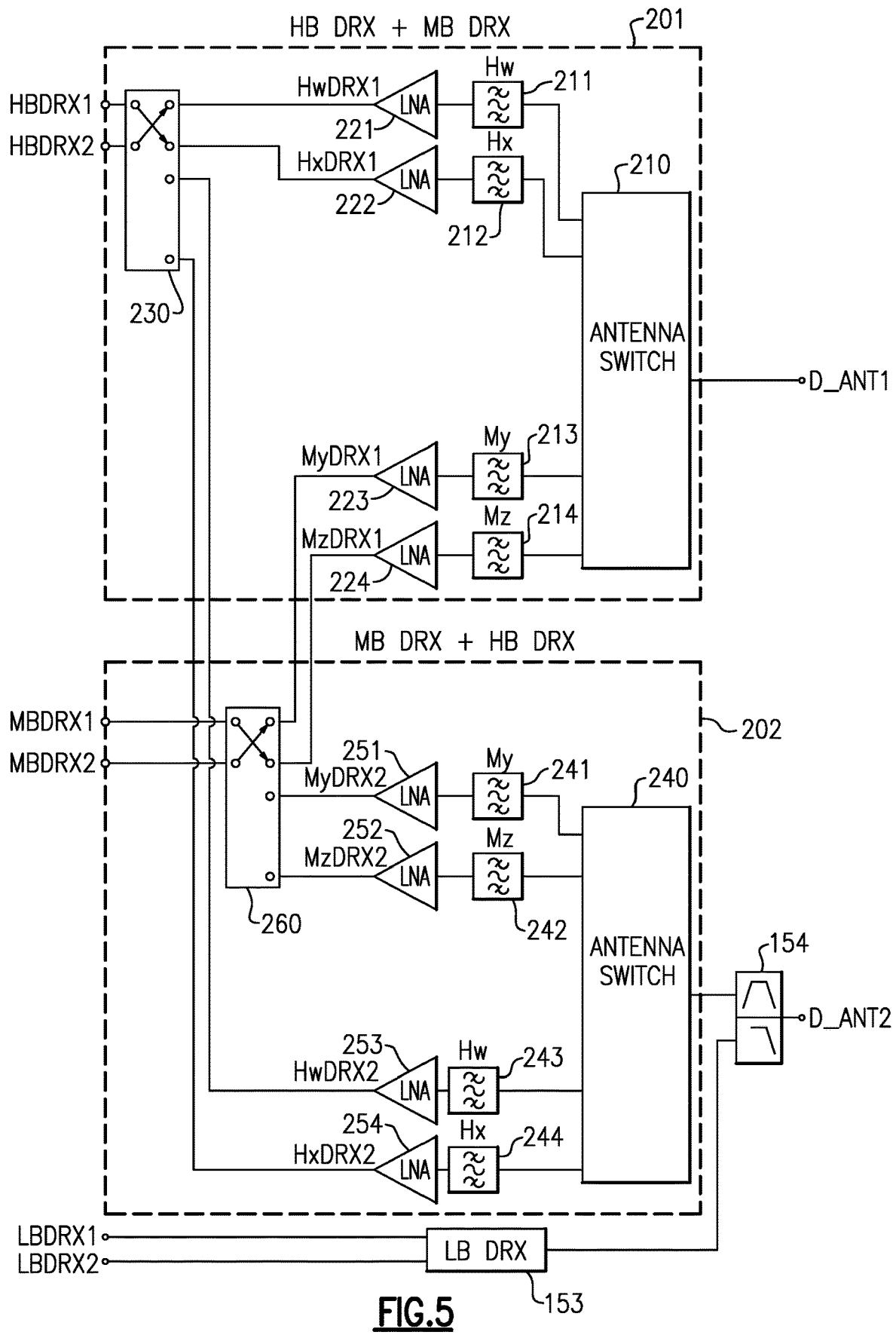
FIG. 5 is a schematic block diagram of diversity modules for an RFFE system, according to some embodiments of the present disclosure.

FIG. 5 is a schematic block diagram of one embodiment of diversity modules for an RFFE system. The illustrated embodiment includes an HB DRX+MB DRX diversity module 201, an MB DRX+HB DRX diversity module 202, an LB DRX diversity module 153, and a diversity diplexer 154.

The HB DRX+MB DRX diversity module 201 includes an antenna switch 210, a first HB filter 211, a second HB filter 212, a first MB filter 213, a second MB filter 214, a first HB LNA 221, a second HB LNA 222, a first MB LNA 223, a second MB LNA 224, and an HB output switch 230. Additionally, the MB DRX+HB DRX diversity module 202 includes an antenna switch 240, a first MB filter 241, a second MB filter 242, a first HB filter 243, a second HB filter 244, a first MB LNA 251, a second MB LNA 252, a first HB LNA 253, a second HB LNA 254, and an MB output switch 260.

The HB DRX+MB DRX diversity module 201 includes the antenna switch 210, which is electrically coupled to the first diversity antenna terminal D_ANT1. The state of the antenna switch 210 can be controlled to couple the first diversity antenna terminal D_ANT1 to one or more of the filters of the diversity module 201.

The HB DRX+MB DRX diversity module 201 generates a variety of HB and MB diversity receive signals, including HB diversity receive signals HwDRX1 and HxDRX1 and MB diversity receive signals MyDRX1 and MzDRX1. As shown in FIG. 5, the MB diversity receive signals MyDRX1 and MzDRX1 are provided from the diversity module 201 to the MB output switch 260 of the diversity module 202. The MB output switch 260 in turn controls which MB diversity receive signals are provided on the MB diversity receive terminals MBDRX1 and MBDRX2.

In the illustrated embodiment, the MB DRX+HB DRX diversity module 202 includes the antenna switch 240, which is electrically coupled to the second diversity antenna terminal D_ANT2 via the diversity diplexer 154. The state of the antenna switch 240 can be controlled to couple the second diversity antenna terminal D_ANT2 to one or more filters of the diversity module 202.

The MB DRX+HB DRX diversity module 202 generates a variety of MB and HB diversity receive signals, including MB diversity receive signals MyDRX2 and MzDRX2 and HB diversity receive signals HwDRX2 and HxDRX2. As shown in FIG. 5, the HB diversity receive signals HwDRX2 and HxDRX2 are provided from the diversity module 202 to the HB output switch 230 of the diversity module 201. The HB output switch 230 in turn controls which HB diversity receive signals are provided on the HB diversity receive terminals HBDRX1 and HBDRX2.

The LB DRX diversity module 153 is electrically coupled to the second diversity antenna terminal D_ANT2 via the diversity diplexer 154. The LB DRX diversity module 153 provides LB diversity receive signals on LB diversity receive terminals LBDRX1 and LBDRX2.

Figure 6:
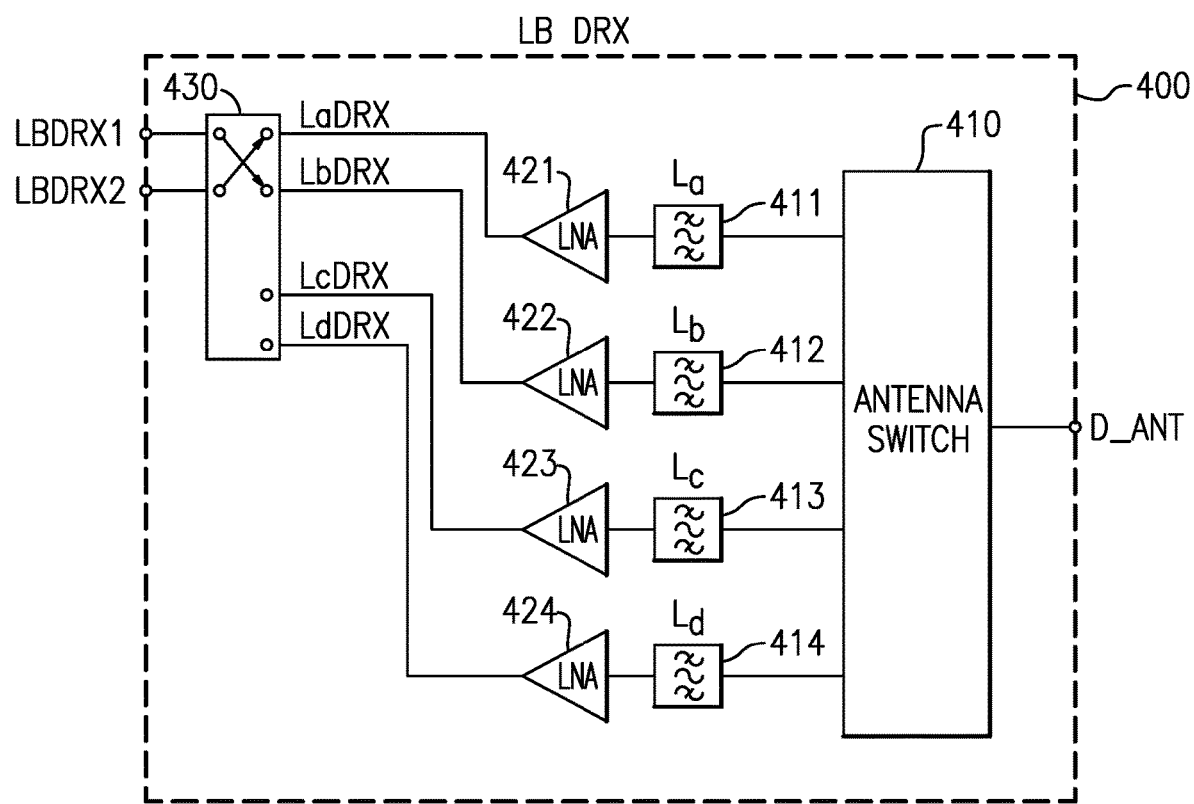
FIG. 6 is a schematic block diagram of a low band diversity module, according to some embodiments of the present disclosure.

FIG. 6 is a schematic block diagram of an LB diversity module 400 according to one embodiment. The LB diversity module 400 includes an LB antenna switch 410, a first LB filter 411, a second LB filter 412, a third LB filter 413, a fourth LB filter 414, a first LB LNA 421, a second LB LNA 422, a third LB LNA 423, a fourth LB LNA 424, and a LB output switch 430.

The antenna switch 410 is used to electrically couple the diversity antenna terminal D_ANT to one or more of the LB filters. Additionally, the illustrated LB diversity module 400 generates LB diversity receive signals LaDRX, LbDRX, LcDRX, and LdDRX, which are provided to the LB output switch 430. The LB output switch 430 selects which LB diversity receive signals to provide to the first diversity receive terminal LBDRX1 and to the second diversity receive terminal LBDRX2.

Although one example of an LB diversity module is shown in FIG. 6, other implementations of diversity modules can be used. For example, more or fewer LB filters can be provided to support a desired number of frequency bands.

Figure 7A:
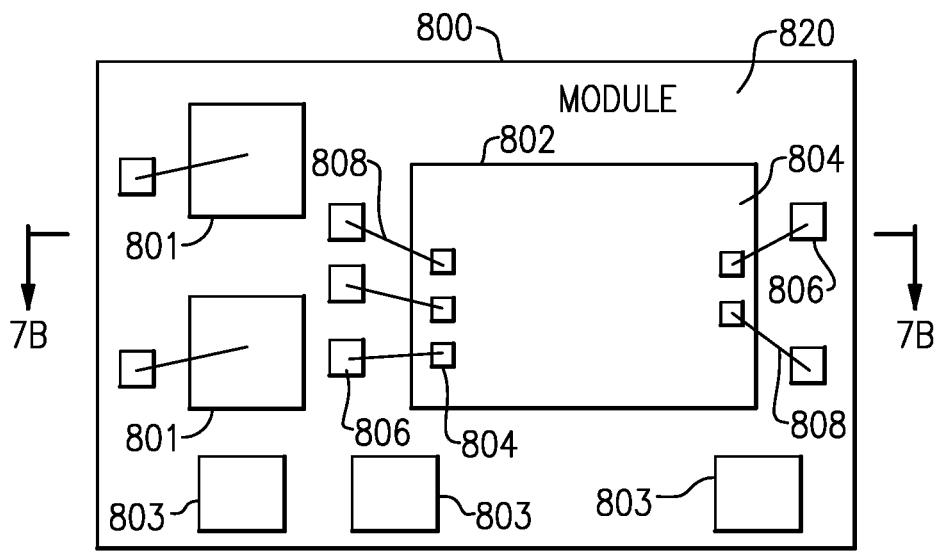
FIG. 7A is a schematic diagram of a packaged module, according to some embodiments of the present disclosure.
Figure 7B:
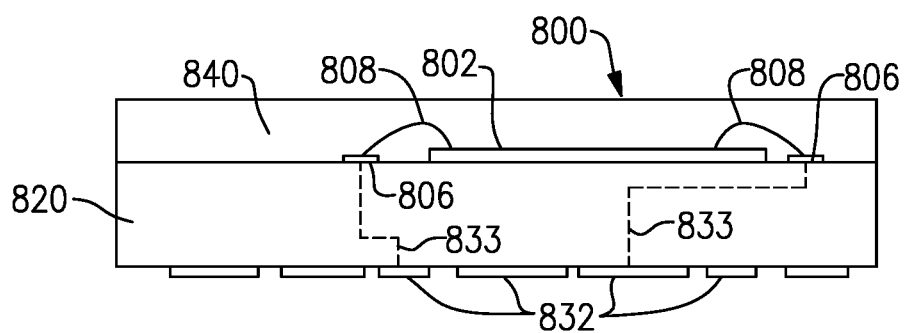
FIG. 7B is a schematic diagram of a cross-section of the packaged module of FIG. 7A, according to some embodiments of the present disclosure.

FIG. 7A is a schematic diagram of one embodiment of a packaged module 800. FIG. 7B is a schematic diagram of a cross-section of the packaged module 800 of FIG. 7A taken along the lines 7B-7B.

The packaged module 800 includes a semiconductor die 801, surface mount components 803, wirebonds 808, a package substrate 820, and encapsulation structure 840. The package substrate 820 includes pads 806 formed from conductors disposed therein. Additionally, the semiconductor die 801 includes pins or pads 804, and the wirebonds 808 have been used to connect the pads 804 of the die 801 to the pads 806 of the package substrate 801.

The RFFE systems herein can include one or more packaged modules, such as the packaged module 800. Although the packaged module 800 of FIGS. 7A-7B illustrates one example implementation of a module suitable for use in an RFFE system, the teachings herein are applicable to modules implemented in other ways.

The packaging substrate 820 can be configured to receive a plurality of components such as the semiconductor die 801 and the surface mount components 803, which can include, for example, surface mount capacitors and/or inductors.

As shown in FIG. 7B, the packaged module 800 is shown to include a plurality of contact pads 832 disposed on the side of the packaged module 800 opposite the side used to mount the semiconductor die 801. Configuring the packaged module 800 in this manner can aid in connecting the packaged module 800 to a circuit board, such as a phone board of a wireless device. The example contact pads 832 can be configured to provide radio frequency signals, bias signals, and/or power (for example, a power supply voltage and ground) to the semiconductor die 801 and/or the surface mount components 803. As shown in FIG. 7B, the electrical connections between the contact pads 832 and the semiconductor die 801 can be facilitated by connections 833 through the package substrate 820. The connections 833 can represent electrical paths formed through the package substrate 820, such as connections associated with vias and conductors of a multilayer laminated package substrate.

In some embodiments, the packaged module 800 can also include one or more packaging structures to, for example, provide protection and/or facilitate handling. Such a packaging structure can include overmold or encapsulation structure 840 formed over the packaging substrate 820 and the components and die(s) disposed thereon.

It will be understood that although the packaged module 800 is described in the context of electrical connections based on wirebonds, one or more features of the present disclosure can also be implemented in other packaging configurations, including, for example, flip chip configurations.

Figure 8:
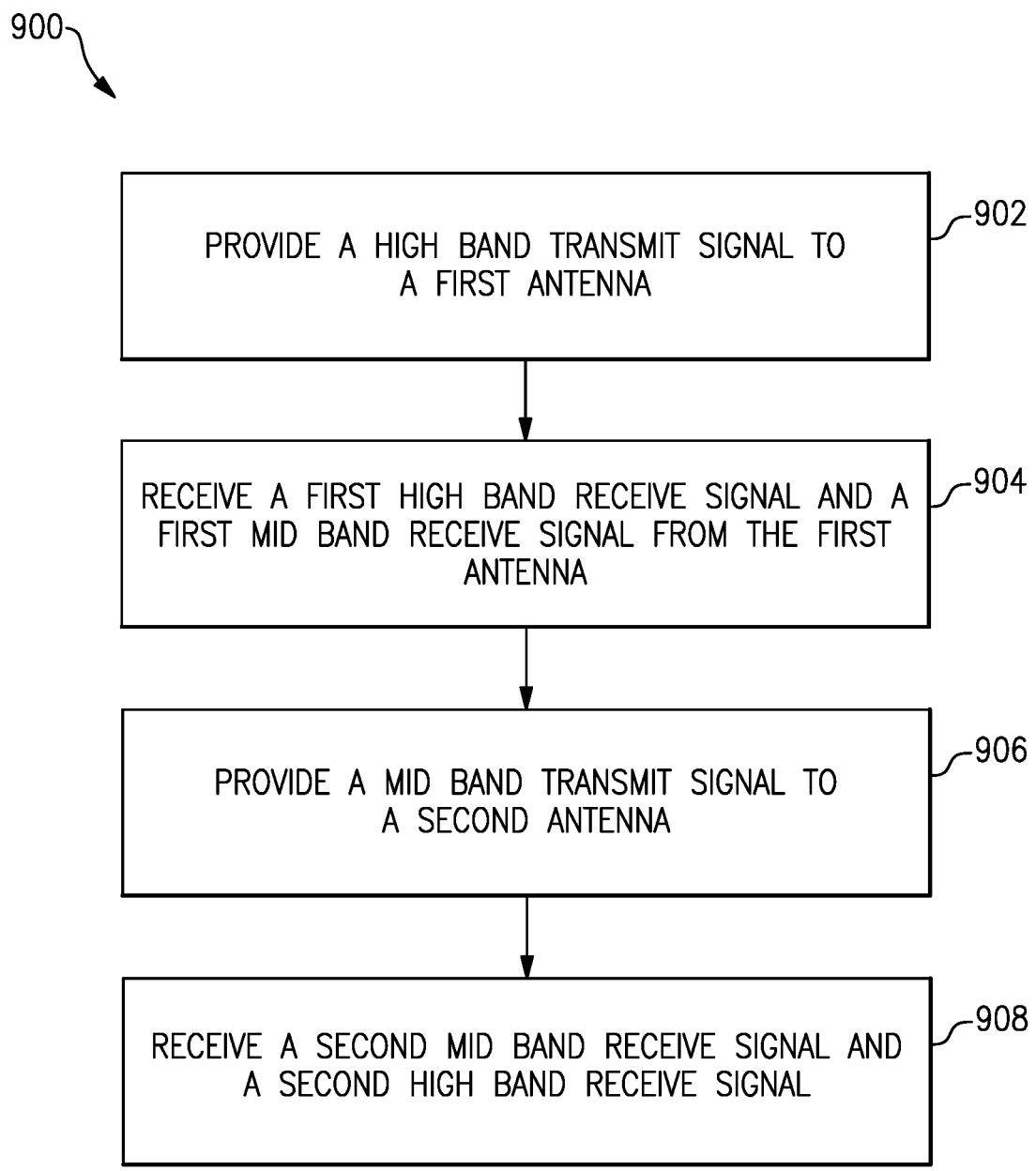
FIG. 8 is a flow diagram of a method of front end signal processing, according to some embodiments of the present disclosure.

FIG. 8 is a flow diagram of a method 900 of front end signal processing, according to some embodiments of the present disclosure. In some implementations, the method 900 includes providing a high band transmit signal to a first antenna using a first transmit and receive module, as represented by block 902, and receiving a first high band receive signal and a first mid band receive signal from the first antenna using the first transmit and receive module as represented by block 904. In some implementations, the first high band receive signal has a frequency content that is greater than a frequency content of the first mid band receive signal. In some implementations, the first high band receive signal has a frequency range that is greater than a frequency range of the first mid band receive signal. The method 900 further includes providing a mid band transmit signal to a second antenna using a second transmit and receive module, as represented by block 906, and receiving a second mid band receive signal and a second high band receive signal from the second antenna using the second transmit and receive module, as represented by block 908. In some implementations, the second high band receive signal has a frequency content that is greater than a frequency content of the second mid band receive signal. In some implementations, the second high band receive signal has a frequency range that is greater than a frequency range of the second mid band receive signal.

Applications

Some of the embodiments described above have provided examples in connection with mobile devices. However, the principles and advantages of the embodiments can be used for any other systems or apparatus that have needs for RFFE systems.

Such RFFE systems can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts may be performed as a single step and/or phase. Also, certain steps and/or phases may be broken into additional sub-components to be performed separately. In some instances, the order of the steps and/or phases may be rearranged and certain steps and/or phases may be omitted entirely. Also, the methods described herein are to be understood to be open-ended, such that additional steps and/or phases to those shown and described herein may also be performed.

Although various embodiments and examples are disclosed above, inventive subject matter extends beyond the specifically disclosed embodiments to other alternative embodiments and/or uses and to modifications and equivalents thereof. Thus, the scope of the claims that may arise from this disclosure is not limited by any of the particular embodiments described above. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Some aspects of the systems and methods described herein may advantageously be implemented using, for example, computer software, hardware, firmware, or any combination of computer software, hardware, and firmware. Computer software may comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that may be implemented using software to be executed on a general purpose computer may also be implemented using a different combination of hardware, software, or firmware. For example, such a module may be implemented completely in hardware using a combination of integrated circuits. Alternatively or additionally, such a feature or function may be implemented completely or partially using specialized computers designed to perform the particular functions described herein rather than by general purpose computers.

Multiple distributed computing devices may be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that may direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations. Furthermore, the terms "first," "second," "third," "fourth," etc., as used herein are meant as labels to distinguish among different elements and may not necessarily have an ordinal meaning according to their numerical designation.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein may be applied to other methods and systems, and are not limited to the methods and systems described above, and elements and acts of the various embodiments described above may be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A wireless device comprising:
a plurality of primary antennas including a first antenna, a second antenna, and a third antenna;
a transceiver; and
a radio frequency front end system electrically coupled between the transceiver and the plurality of primary antennas, the radio frequency front end system including a first transmit and receive module operable to provide a high band transmit signal to the first antenna and to receive a first high band receive signal and a first mid band receive signal from the first antenna, the first high band receive signal having a frequency range that is greater than a frequency range of the first mid band receive signal, the radio frequency front end system further including a second transmit and receive module operable to provide a mid band transmit signal to the second antenna and to receive a second mid band receive signal and a second high band receive signal from the second antenna, the second high band receive signal having a frequency range that is greater than a frequency range of the second mid band receive signal, the radio frequency front end system further including a third transmit and receive module operable to provide a low band transmit signal to the third antenna and to receive a low band receive signal from the third antenna.

2. The wireless device of claim 1 wherein the first high band receive signal and the second high band receive signal are operable to support downlink multi-input and multi-output communications.

3. The wireless device of claim 1 wherein the first mid band receive signal and the second mid band receive signal are operable to support downlink multi-input and multi-output communications.

4. The wireless device of claim 1 wherein the first high band receive signal and the first mid band receive signal are operable to support carrier aggregation.

5. The wireless device of claim 1 wherein the second mid band receive signal and the second high band receive signal are operable to support carrier aggregation.

6. The wireless device of claim 1 wherein the first transmit and receive module includes a first plurality of high band signal paths and a first plurality of mid band signal paths that are switch coupled to the first antenna.

7. The wireless device of claim 6 wherein the second transmit and receive module includes a second plurality of high band signal paths and a second plurality of mid band signal paths that are switch coupled to the second antenna.

8. The wireless device of claim 1 wherein the first transmit and receive module is electrically coupled to the first antenna without an intervening multiband handling element.

9. The wireless device of claim 1 further comprising a plurality of diversity antennas including a first diversity antenna and a second diversity antenna, the radio frequency front end system electrically coupled between the transceiver and the plurality of diversity antennas.

10. The wireless device of claim 9 wherein the radio frequency front end system further includes a first diversity module configured to receive a first high band diversity receive signal and a first mid band diversity receive signal from the first diversity antenna.

11. The wireless device of claim 10 wherein the radio frequency front end system further includes a second diversity module configured to receive a second mid band diversity receive signal and a second high band diversity receive signal from the second diversity antenna.

12. The wireless device of claim 11 wherein the first diversity module includes a high band output switch configured to receive a plurality of high band diversity receive signals including the first high band diversity receive signal and the second high band diversity receive signal, the high band output switch further configured to provide the transceiver with a selected high band diversity receive signal.

13. The wireless device of claim 11 wherein the second diversity module includes a mid band output switch configured to receive a plurality of mid band diversity receive signals including the first mid band diversity receive signal and the second mid band diversity receive signal, the mid band output switch further configured to provide the transceiver with a selected mid band diversity receive signal.

14. The wireless device of claim 11 wherein the radio frequency front end system is operable to support four-by-four receive multi-input and multi-output communications.

15. The wireless device of claim 1 wherein the mid band transmit signal, the first mid band receive signal, and the second mid band receive signal have frequencies between 1 GHz and 2.3 GHz, and the high band transmit signal, the first high band receive signal, and the second high band receive signal have frequencies greater than 2.3 GHz.

16. A method of front end signal processing in a wireless device, the method comprising:
providing a high band transmit signal to a first antenna using a first transmit and receive module;
receiving a first high band receive signal and a first mid band receive signal from the first antenna using the first transmit and receive module, the first high band receive signal having a frequency range that is greater than a frequency range of the first mid band receive signal;
providing a mid band transmit signal to a second antenna using a second transmit and receive module;
receiving a second mid band receive signal and a second high band receive signal from the second antenna using the second transmit and receive module, the second high band receive signal having a frequency range that is greater than a frequency range of the second mid band receive signal;
providing a low band transmit signal to a third antenna using a third transmit and receive module; and
receiving a low band receive signal from the third antenna using the third transmit and receive module.

17. The method of claim 16 further comprising providing downlink multi-input and multi-output communications using the first high band receive signal and the second high band receive signal.

18. A radio frequency front end system for a wireless device, the radio frequency front end system comprising:
a first antenna terminal;
a first transmit and receive module electrically coupled to the first antenna terminal, the first transmit and receive module operable to provide a high band transmit signal to the first antenna terminal and to receive a first high band receive signal and a first mid band receive signal from the first antenna terminal, the first high band receive signal having a frequency range that is greater than a frequency range of the first mid band receive signal;
a second antenna terminal;
a second transmit and receive module electrically coupled to the second antenna terminal, the second transmit and receive module operable to provide a mid band transmit signal to the second antenna terminal and to receive a second mid band receive signal and a second high band receive signal from the second antenna terminal, the second high band receive signal having a frequency range that is greater than a frequency range of the second mid band receive signal;
a third antenna terminal; and
a third transmit and receive module electrically coupled to the third antenna terminal, the third transmit and receive module operable to provide a low band transmit signal to the third antenna terminal and to receive a low band receive signal from the third antenna terminal.

19. The radio frequency front end system of claim 18 further comprising a first diversity antenna terminal and a first diversity module configured to receive a first high band diversity receive signal and a first mid band diversity receive signal from the first diversity antenna terminal.

20. The radio frequency front end system of claim 19 further comprising a second diversity antenna terminal and a second diversity module configured to receive a second mid band diversity receive signal and a second high band diversity receive signal from the second diversity antenna terminal.

\* \* \* \* \*